US010704409B2

(12) United States Patent
Michel et al.

(10) Patent No.: US 10,704,409 B2
(45) Date of Patent: Jul. 7, 2020

(54) SYSTEMS AND METHODS TO DETECT A FLUID INDUCED INSTABILITY CONDITION IN A TURBOMACHINE

(71) Applicant: GENERAL ELECTRIC COMPANY, Schenectady, NY (US)

(72) Inventors: Edward Michel, Atlanta, GA (US); Kiran Vangari, Telangana (IN); Scott Wood, Atlanta, GA (US); Timothy Maker, Atlanta, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 326 days.

(21) Appl. No.: 15/882,431

(22) Filed: Jan. 29, 2018

(65) Prior Publication Data

US 2018/0216487 A1 Aug. 2, 2018

(51) Int. Cl.
*G01M 15/14* (2006.01)
*F01D 17/02* (2006.01)
(Continued)

(52) U.S. Cl.
CPC .......... *F01D 17/02* (2013.01); *F01D 21/003* (2013.01); *F01D 25/16* (2013.01); *F01D 25/166* (2013.01);
(Continued)

(58) Field of Classification Search
CPC ........ F01D 17/02; F01D 25/166; F01D 25/18; F01D 21/003; F01D 25/16; G06F 16/219;
(Continued)

(56) References Cited

U.S. PATENT DOCUMENTS 4,448,077 A 5/1984 Sato et al.
5,686,669 A * 11/1997 Hernandez ............. G01H 1/003
73/660

(Continued)

FOREIGN PATENT DOCUMENTS

CN 1217056 A 5/1999
CN 102288283 A 12/2011

OTHER PUBLICATIONS

Chang-Jian, C., et al.,"Nonlinear dynamic analysis of a hybrid squeeze-film damper-mounted rigid rotor lubricated with couple stress fluid and active control," Applied Mathematical Modelling, vol. 34, Issue 9, pp. 2493-2507 (Sep. 2010).
Norfield, D., "Practical Balancing of Rotating Machinery," Elsevier, Chapter 1, pp. 1-217 (Mar. 8, 2006).
(Continued)

*Primary Examiner* — Robert R Raevis
(74) *Attorney, Agent, or Firm* — Eversheds Sutherland (US) LLP (57) ABSTRACT

In one example embodiment, a fluid induced instability detection system is provided that monitors various vibration characteristics of a turbomachine, collects vibration data in real-time, and uses the vibration data to detect and analyze changes in various operating parameters such as vibration, speed, and loading conditions, and to provide an indication of a vibration anomaly and/or potential operational risk in one or more components of the turbomachine. The vibration data can be particularly associated with certain components that are directly or indirectly impacted by a modification in process fluid flow characteristics or lubrication oil flow characteristics in the turbomachine due to various reasons such as process fluid flow disturbances, lubricating oil flow disturbances, and/or a change in turbomachine operational parameters. The fluid induced instability detection system detects abnormalities in the vibration data and provides an indication of one or more potential faults in the turbomachine.

20 Claims, 6 Drawing Sheets

(51) Int. Cl.
*G06F 16/21* (2019.01)
*G01H 1/16* (2006.01)
*G01H 1/00* (2006.01)
*F01D 25/16* (2006.01)
*F01D 25/18* (2006.01)
*G01N 29/02* (2006.01)
*G01N 29/44* (2006.01)
*F01D 21/00* (2006.01)
*G01N 29/12* (2006.01)

(52) U.S. Cl.
CPC .............. *F01D 25/18* (2013.01); *G01H 1/006* (2013.01); *G01H 1/16* (2013.01); *G01M 15/14* (2013.01); *G01N 29/02* (2013.01); *G01N 29/12* (2013.01); *G01N 29/4427* (2013.01); *G06F 16/219* (2019.01); *F05D 2260/80* (2013.01); *G01N 2291/0226* (2013.01)

(58) Field of Classification Search
CPC .... G01M 13/023; G01M 15/14; G01H 1/006; G01H 1/003; G01H 1/16; F05D 2260/80; G01N 2291/0226; G01N 29/02; G01N 29/4427; G01N 29/12
USPC ......... 73/7, 9, 577, 579, 582, 583, 586, 587, 73/588, 593, 112.01–112.06, 168; 701/100; 417/63; 415/118
See application file for complete search history.

(56) References Cited

U.S. PATENT DOCUMENTS

| | | |
|---|---|---|
| 2005/0275300 A1 | 12/2005 | Ei-Shafei |
| 2009/0238689 A1 | 9/2009 | Jamil et al. |
| 2015/0369687 A1 | 12/2015 | Furman et al. |

OTHER PUBLICATIONS

Nembhard, A. D., et al., "Comparison of experimental observations in rotating machines with simple mathematical simulations," Measurement, vol. 89, pp. 120-136 (Apr. 2016).
Extended European Search Report and Opinion issued in connection with corresponding EP Application No. 18152800.1 dated May 14, 2018.

* cited by examiner

SYSTEMS AND METHODS TO DETECT A FLUID INDUCED INSTABILITY CONDITION IN A TURBOMACHINE

CROSS REFERENCE TO RELATED APPLICATIONS

This application claims the priority benefit of Indian Patent Application No. 201741003452 filed on Jan. 30, 2017. The contents of this application is hereby incorporated by reference in their entirety.

FIELD OF THE DISCLOSURE

This disclosure relates to turbomachines, and more particularly, to systems and methods to detect a fluid induced instability condition in a turbomachine.

BACKGROUND OF THE DISCLOSURE

Turbomachines are machines that operate based on an interaction between a fluid and a machine part. One example of a turbomachine is a gas turbine that uses a fluid (heated gas) to move the blades of a rotor assembly. Another example is a compressor that uses an element such as a piston to compress a fluid (air-gas mixture). Most of these machines are quite complex in structure and contain a large number of components. As is the case with any component, especially a moving component exposed to constant wear and tear, various components of a turbomachine can develop a fault that can lead to a failure of the turbomachine. Consequently, various types of monitoring devices and/or sensor devices are used to constantly monitor the status of various components of the turbomachine and provide early warning of an impending failure or breakdown.

Some faults are relatively easy to monitor and detect, whereas some others are somewhat subtle in nature and difficult to identify. For example, a barely noticeable low-frequency vibration in a component of a turbomachine may lead to a resonant frequency vibration of a much larger magnitude and a sudden catastrophic failure. Some other faults such as a subtle change in the nature of a flow of a hot gas may raise the temperature of a component beyond an operable limit and lead to a breakdown of the component.

BRIEF DESCRIPTION OF THE DISCLOSURE

Embodiments of the disclosure are directed generally to systems and methods to detect a fluid induced instability condition in a turbomachine.

In an exemplary embodiment in accordance with the disclosure, a system can include a turbomachine, a sensor system, and a fluid induced instability detection system. The sensor system is coupled to the turbomachine and is configured to monitor at least two vibration parameters of the turbomachine when the turbomachine is in operation. The fluid induced instability detection system is configured to receive the at least two vibration parameters from the sensor system, and to use the at least two vibration parameters to detect a change in one or more fluid flow characteristics. The change in fluid flow characteristics can be indicative of a fluid induced instability condition in the turbomachine.

In another exemplary embodiment in accordance with the disclosure a method can include monitoring at least two vibration parameters of a turbomachine when the turbomachine is in operation; and using at least the at least two vibration parameters to detect a fluid induced instability condition in the turbomachine.

In yet another exemplary embodiment in accordance with the disclosure a non-transitory computer-readable storage medium can have instructions executable by at least one computer for performing operations that include receiving from a sensor system, at least two vibration parameters of a turbomachine when the turbomachine is in operation; and using at least the at least two vibration parameters to detect a fluid induced instability condition in the turbomachine.

Other embodiments and aspects of the disclosure will become apparent from the following description taken in conjunction with the following drawings.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION OF THE DISCLOSURE

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein; rather, these embodiments are provided so that this disclosure will satisfy applicable legal requirements. Like numbers refer to like elements throughout. It should be understood that certain words and terms are used herein solely for convenience and such words and terms should be interpreted as referring to various objects and actions that are generally understood in various forms and equivalencies by persons of ordinary skill in the art. For example, it should be understood that the word "turbomachine" as used herein generally refers to a machine that uses a fluid (gas, liquid, vapor etc.) for executing a primary function (rotating a rotor for example) but also uses fluids such as lubricating oil for various auxiliary purposes (such as preventing the rotor from overheating). Some examples of such machines include a gas turbine, a steam turbine, a generator, an expander, a fan, a compressor, a pump, or a machine that includes fluid film bearings. The word "link" as used herein can include for example, a single communication element (a wire, an optical fiber, a wireless connection etc.), multiple communication elements, and/or one or more mechanical elements (a shaft, a coupler, etc.). Furthermore, the word "example" as used herein is intended to be non-exclusionary and non-limiting in nature. More particularly, the word "exemplary" as used herein indicates one among several examples, and it should be understood that no undue emphasis or preference is being directed to the particular example being described.

In terms of a general overview, certain embodiments of the systems and methods described herein are directed to a fluid induced instability detection system that monitors various vibration characteristics of a turbomachine, collects vibration data in real-time, and uses various parameters such as thresholds, machine specifications, and historical data, to detect and analyze changes in various operating parameters such as vibration, speed, and loading conditions, and to provide an indication of a potential failure in one or more components of the turbomachine. The vibration data can be associated with certain components that are directly or indirectly impacted by a modification in fluid flow characteristics of the turbomachine due to various reasons such as a process fluid flow disturbance, a lubricating oil flow disturbance, and/or a change in turbomachine operational parameters. The fluid induced instability detection system detects abnormalities in the vibration data and provides an indication of one or more potential faults in the turbomachine. As can be appreciated, the volume of vibration data as well as the subtle nature of an abnormality in the vibration data cannot be reasonably processed by a human being, especially ahead of time before the occurrence of a fault.

Figure 1:
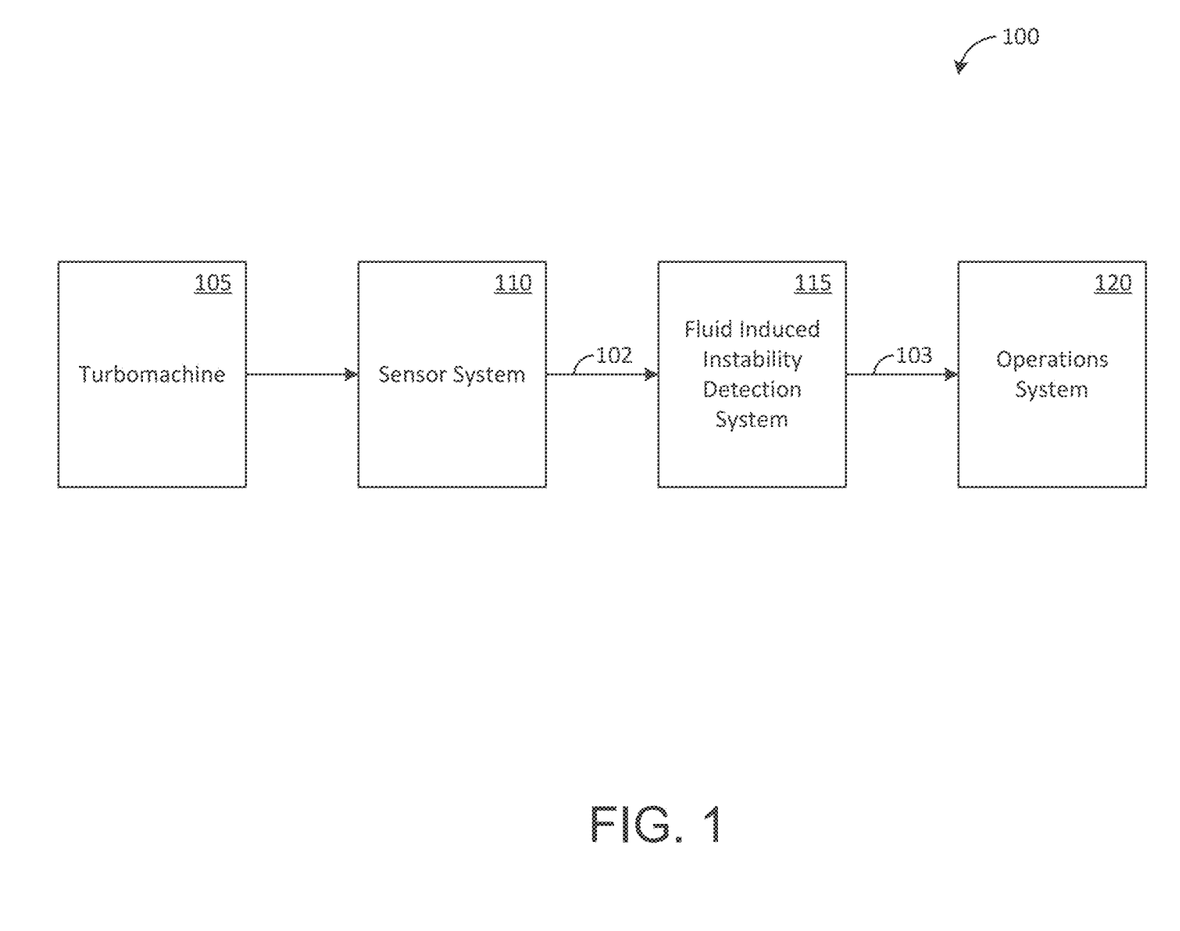
FIG. 1 illustrates a system that includes a fluid induced instability detection system in accordance with an exemplary embodiment of the disclosure.

Attention is now drawn to FIG. 1, which illustrates a system 100 that includes a fluid induced instability detection system 115 in accordance with an exemplary embodiment of the disclosure. The fluid induced instability detection system 115 can be used to execute real-time processing of sensor data associated with vibration events taking place in a turbomachine 105. The sensor data can be provided (via a link 102) to the fluid induced instability detection system 115 by a sensor system 110 that is coupled to the turbomachine 105. The sensor system 110 can not only include vibration sensors but can include other sensors for monitoring other parameters (temperature, fluid flow, rotational speed, acceleration etc.) of various components of the turbomachine 105. The fluid induced instability detection system 115 analyzes the sensor data in order to execute functions such as detecting impending faults, and provides the results of the analysis to an operating system 120 (via a link 103). The operating system 120 can be any suitable device (such as a remotely-located server computer or a graphical user interface (GUI) located near the turbomachine 105) that a human operator can interact with in order to view the information provided by the fluid induced instability detection system 115. Depending on the nature of the information, the human operator can take preventive action to prevent a fault from occurring or can carry out repairs on a fault that has already taken place. The preventive action can include operations such as replacing parts, changing the operating characteristics of the turbomachine 105, and/or carrying out maintenance operations.

Figure 2:
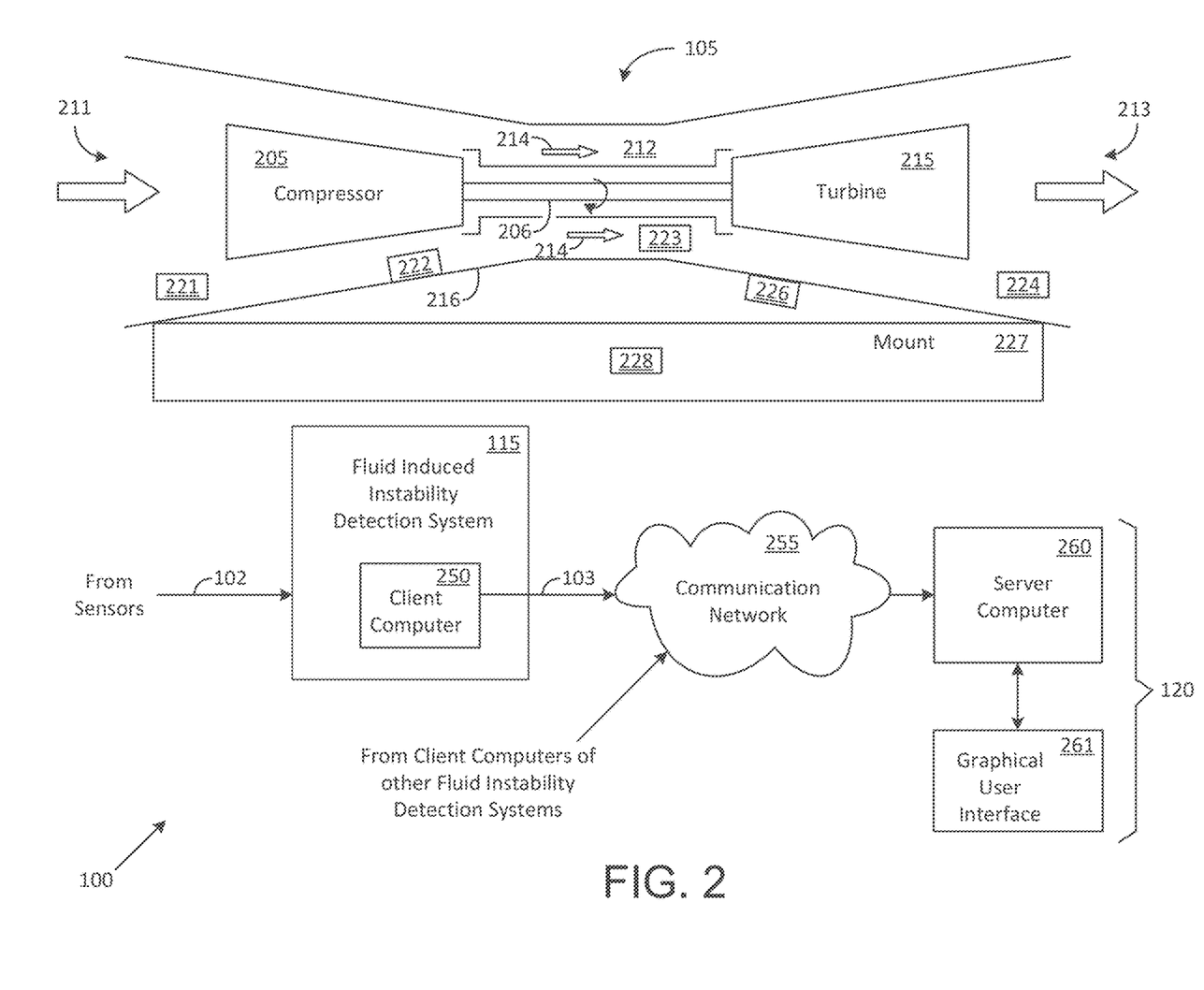
FIG. 2 illustrates some additional details of the system shown in FIG. 1 in accordance with an exemplary embodiment of the disclosure.

Attention is next drawn to FIG. 2, which illustrates some additional details of the system 100. In this exemplary embodiment, the turbomachine 105 includes a compressor 205 coupled to a turbine 215. The turbine 215, which can be a gas turbine in one exemplary implementation, is configured to operate based on a fluid flow provided by the compressor 205. For example, when the turbine 215 is a gas turbine, the compressor 205 injects hot compressed gas into the turbine 215 (as indicated by the arrows 214). The hot compressed gas pushes against the blades of a rotor (not shown) in the turbine 215 and generates a rotation in a shaft 206. The shaft 206, which links the compressor 205 to the turbine 215, assists the compressor 205 in generating the hot compressed gas.

A casing 216 of the turbomachine 105 is specifically shaped for receiving air through an inlet port 211 and imposing a Venturi effect upon the flow of hot compressed gas from the compressor 205, through a neck area 212, through the turbine 215, and out via an exhaust port 213. Various sensors can be provided at various locations in the turbomachine 105 for monitoring various parameters such as temperature, vibration, flow rate, displacement, and gas pressure. These locations can include an outside surface of the casing 216, an inside surface of the casing 216, and various surfaces of various components such as the compressor 205, the neck area 212, the turbine 215, and the exhaust port 213. For example, a thermal sensor 221 can be used to sense a temperature near the inlet port 211, a thermal sensor 224 can be used to sense a temperature near the exhaust port 213, a velocity sensor 223 can be used to monitor air/gas flow in the neck portion of the turbomachine 105, a vibration sensor 222 can be mounted upon an internal surface of the casing 216 for monitoring vibration parameters on an inside portion of the casing 216, a vibration sensor 226 can be mounted upon an outside surface of the casing 216 for monitoring vibration parameters on the outside surface of the casing 216, a vibration sensor 228 can be attached to a mount 227 upon which the turbomachine 105 is mounted. The mount 227 includes various mechanical components such as plates, brackets, flanges, rods, springs, bearings, and attachment hardware.

It can be understood that the turbomachine 105 includes various moving parts (such as the blades of the rotor in the turbine 215 and the shaft 206) as well as fixed parts (such as the casing 216), both of which can undergo vibration when the turbomachine 105 is in operation. The vibration sensors associated with the turbomachine 105 (which constitute the sensor system 110 shown in FIG. 1) can be used to monitor various motion related parameters such as displacement, velocity and acceleration, that are indicative of vibration. One or more of these motion related parameters can be selected on the basis of specific frequencies of interest (low sub-audio frequencies, about 1-100 Hz, for example). One or more of the various sensors can be an accelerometer that measures a wide range of frequencies. The vibration sensors can be non-contact sensors that are selected for measuring various motion characteristics of various components of the turbomachine 105 (rotary speed and/or vibration of the shaft 206, for example). The non-contact sensors can also be used to measure relative motion between two moving components and/or between a moving component and a fixed component.

The data generated by the various sensors of the turbomachine 105 is coupled into the fluid induced instability detection system 115 via the link 102. The fluid induced instability detection system 115 analyzes the sensor data, with particular reference to analyzing and identifying changes and/or trends in vibration characteristics of various components of the turbomachine 105. These changes can include a change in an amplitude or a rate change in a synchronous vibration parameter and/or a broadband vibration parameter. The synchronous vibration parameter pertains to vibrations in one or more components of the turbomachine 105 as a direct result of a running speed of the turbomachine 105. Thus, when a rotor of the turbine 215 is rotating at about 3600 rpm for example, the synchronous vibration parameter pertains to a frequency of vibration that is directly attributable to the rotor rotating at about 3600 rpm.

On the other hand, the broadband vibration parameter pertains to a combination of the frequency of vibration attributable to the running speed of the turbomachine 105 and other frequency components that are contributed by one or more components in the turbomachine 105 moving in a manner that is not directly relatable to the running speed of the turbomachine 105. A change in the broadband vibration parameter, which can indicate a modification in the operating characteristics of the turbomachine, can occur as a result of a fluid-induced instability condition. A fluid-induced instability condition can be characterized at least in part, by a type of self-excited vibration that can arise as a result of a component (the rotor, for example) interacting abnormally with a surrounding fluid in an enclosed space. The surrounding fluid can be lubricating oil that lubricates various bearings and seals in the rotor, or can be a process fluid (such as a hot gas) that is used to operate the rotor. The self-excited vibration can occur as a result of various factors, such as a change in the characteristics of the lubricating oil (a high level of water content, a change in viscosity, and/or a change in pressure, for example); a change in clearance between two elements (between a bearing and a shaft, for example); and/or an increase in surface roughness of a part (such as a rotor journal or a bearing surface that is in contact with the lubricating oil).

In another example, the broadband vibration parameter can pertain to a combination of the frequency of vibration attributable to the about 3600 rpm of the rotor and at least one other frequency of vibration which is different from the running speed of the turbomachine. Under normal conditions, the broadband vibration parameter can be attributed predominantly to the running speed vibration component but when there is an abnormality (such as a disturbance in lubricating film flow parameters, a disturbance in process fluid flow parameters, and/or a fixed part vibrating at an abnormal frequency), the abnormality can cause a change in the broadband vibration parameter. The change in the broadband vibration parameter can be indicative of a fluid induced instability condition that can be detected in accordance with the disclosure.

The data that is provided to the fluid induced instability detection system 115 by the various sensors is processed in real-time by a client computer 250 that can be a part of the fluid induced instability detection system 115. Real-time processing is significant because it can be carried out when the turbomachine 105 is in operation so as to obtain vibration data indicative of potential fault conditions prior to occurrence of one or more faults. The real-time processing can be characterized in at least one exemplary implementation, by a data analysis that is performed by the client computer 250 at a pre-determined sampling rate or by using a pre-determined resolution parameter (1 second time interval, for example). When the data analysis indicates an abnormality and/or an anomaly in the vibration characteristics of the turbomachine 105, the client computer 250 transmits a notification (a message, for example) via the communication network 255 to a server computer 260. The server computer 260 can respond to the message by providing a warning to a human operator via the graphical user interface 261. In another example implementation, the client computer 250 can transmit a signal to activate a warning light or a bell, or can display a warning message on a graphical user interface associated with the client computer 250. The client computer 250 can also be configured to transmit to the server computer 260, raw data received from the sensors in the turbomachine 105 in unprocessed form or after partial processing. The server computer 260 can process the raw data, independently or in cooperation with the client computer 250, to derive various results including indications of one or more vibration anomalies when the turbomachine is in operation.

The communication network 255 can be one of various networks, such as a local area network, a wide area network, a corporate network, or the Internet. Other client computers associated with other fluid induced instability detection systems such as the fluid induced instability detection system 115 can also provide sensor data to the server computer 260 via the communication network 255. The sensor data provided by the various fluid induced instability detection systems can be used to carry out group-based analysis, which can include various types of comparative analysis and evaluation of vibration abnormalities and/or anomalies in one or more than one of the various fluid induced instability detection systems.

Figure 3:
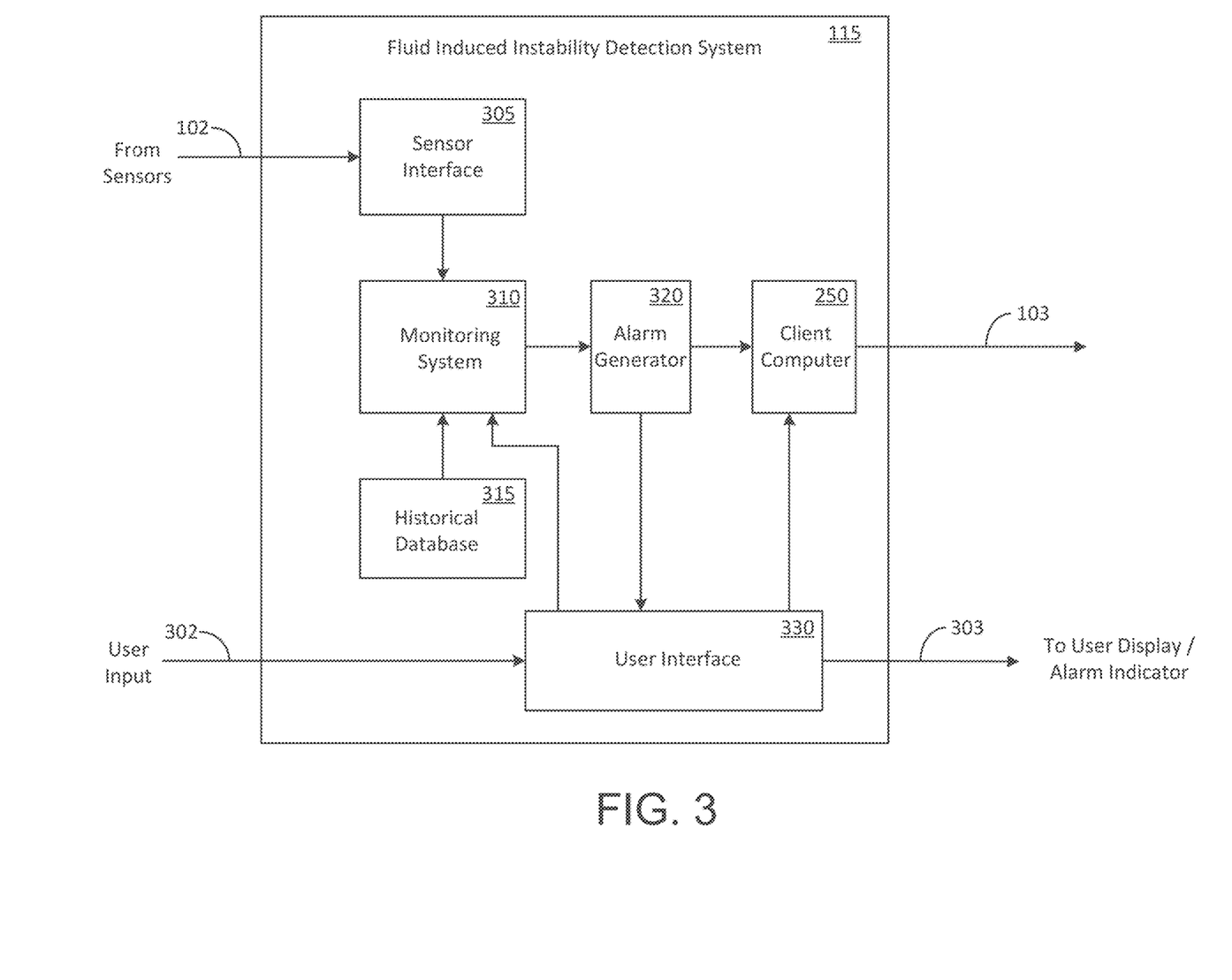
FIG. 3 illustrates some exemplary components that may be included in a fluid induced instability detection system in accordance with an exemplary embodiment of the disclosure.

Attention is next drawn to FIG. 3, which illustrates some exemplary components that may be included in the fluid induced instability detection system 115. The sensor interface 305, which is provided to receive sensor data via the link 102, can include various components, such as one or more of a receiver, a signal amplifier, and an analog-to-digital converter (ADC). The sensor interface 305 forwards the received data to a monitoring system 310 that analyzes the sensor data to detect vibration abnormalities or anomalies. A historical database 315 can be used by the monitoring system 310 for this purpose. Upon detecting an abnormal condition in the turbomachine 105 based on the data analysis, the monitoring system 310 transmits some data pertaining to the abnormal condition to an alarm generator 320. The alarm generator 320 can apply various thresholds to determine a degree of criticality of the abnormal condition and forward a notification (a message indicating a low-level warning, a high-level warning, or a critical-level warning, for example) to the client computer 250 for forwarding to the server computer 260 via link 103. In addition to, or in lieu of, transmitting the notification to the client computer 250, the alarm generator 320 can transmit the notification to a user interface 330 (a local device) that can be accessed by a human operator (via link 302) and can provide warning signals to a user display and/or to an alarm indicator (bell, light, etc.) (via link 303).

Figure 4:
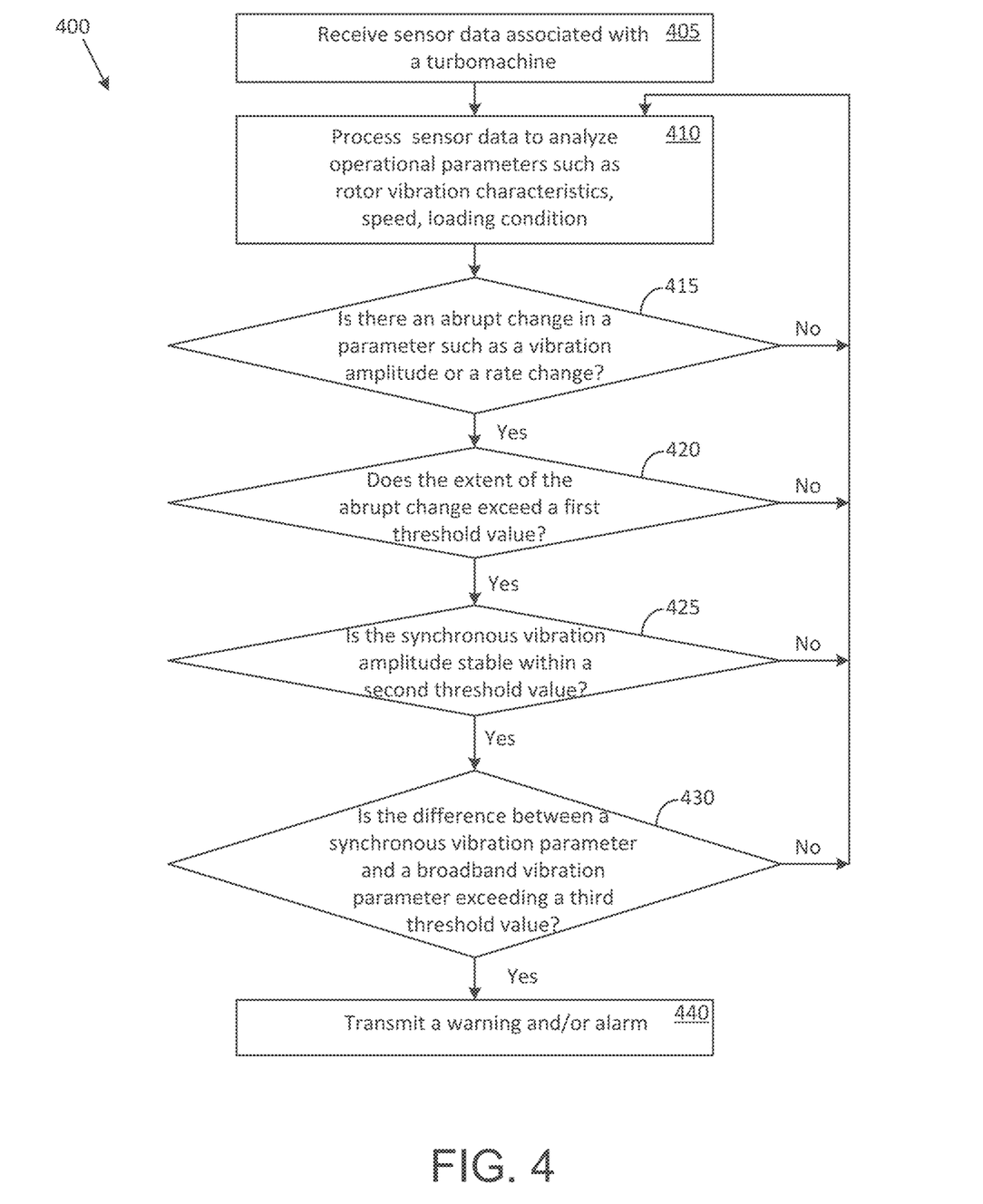
FIG. 4 illustrates a flowchart of a method of detecting a fluid induced instability condition in a turbomachine in accordance with an exemplary embodiment of the disclosure.

FIG. 4 illustrates a flowchart 400 of a method of detecting a fluid induced instability condition in the turbomachine 105 in accordance with an exemplary embodiment of the disclosure. The flowchart 400 will be described using the various elements shown in FIGS. 1-3. In block 405, sensor data is received in the client computer 250 that can be a part of the fluid induced instability detection system 115. The sensor data is particularly directed at providing vibration-related information. In block 410, the sensor data is processed in order to analyze various operational characteristics of the turbomachine 105 and detect one or more potential fault induced instability conditions. Analyzing the operational characteristics can be based on vibration parameters and speed parameters of various components such as a rotor in the turbine 215, a speed of rotation of one or more parts such as the rotor in the turbine 215, the shaft 206, and/or parts of the compressor 205. Analyzing the operational characteristics can be further based on load parameters associated with the operation of the turbomachine 105 at various instants in time.

In block 415, a determination is made whether an abrupt change in a parameter such a vibration amplitude or a rate change has occurred or is taking place in the turbomachine 105. If an abrupt change is detected, the extent of the abrupt change is evaluated in block 420 so as to determine if the abrupt change is due to a fluid induced instability condition. The evaluation can be carried out for example by using a first threshold value to determine a magnitude of the abrupt change (a change in a synchronous vibration parameter of the turbomachine 105, for example). If it is determined in block 420 that the abrupt change does not exceed the first threshold value, operation of the flowchart 400 reverts to block 410. On the other hand, if it is determined in block 420 that the abrupt change does exceed the first threshold value, operation of the flowchart 400 proceeds to block 425.

In block 425, a determination is made whether a synchronous vibration amplitude is stable so as to ensure for example, that the primary running component (a rotor of the turbine 215, for example) is operating normally. The evaluation can be carried out for example by using a second threshold value (or a range of values) to determine an extent of change in the synchronous vibration amplitude. If it is determined in block 425 that the synchronous vibration amplitude is stable, operation of the flowchart 400 reverts to block 410. On the other hand, if it is determined in block 425 that the synchronous vibration amplitude is not stable, operation of the flowchart 400 proceeds to block 430.

In block 430, a determination is made whether a difference between the synchronous vibration parameter of the turbomachine 105 and a broadband vibration parameter of the turbomachine 105 exceeds a third threshold value. If it is determined in block 425 that the difference does not exceed the second threshold value, operation of the flowchart 400 reverts to block 410. On the other hand, if it is determined in block 420 that the difference does exceed the third threshold value, operation of the flowchart 400 proceeds to block 430. Exceeding the third threshold value is indicative of a fluid induced instability condition caused by one or more components other than the primary running component of the turbomachine 105. When this occurs, a warning and/or alarm signal can be provided (as indicated in block 440).

It should be understood that the various threshold values referred to above, can be derived on the basis of historical performance of one or more turbomachines. The historical performance parameters can be provided in the form of the historical database 315 shown in FIG. 3. It should also be understood that in alternative embodiments, the operations described above with respect to using threshold values, can be complemented or replaced by mathematical operations. The mathematical operations can include applying a mathematical formula to process a combination of two or more of a synchronous vibration parameter, a broadband vibration parameter, a speed parameter, and a load parameter. Applying the mathematical formula can also include one or more of an addition operation, a subtraction operation, a multiplying operation, a division operation, or an integration operation.

Figure 5:
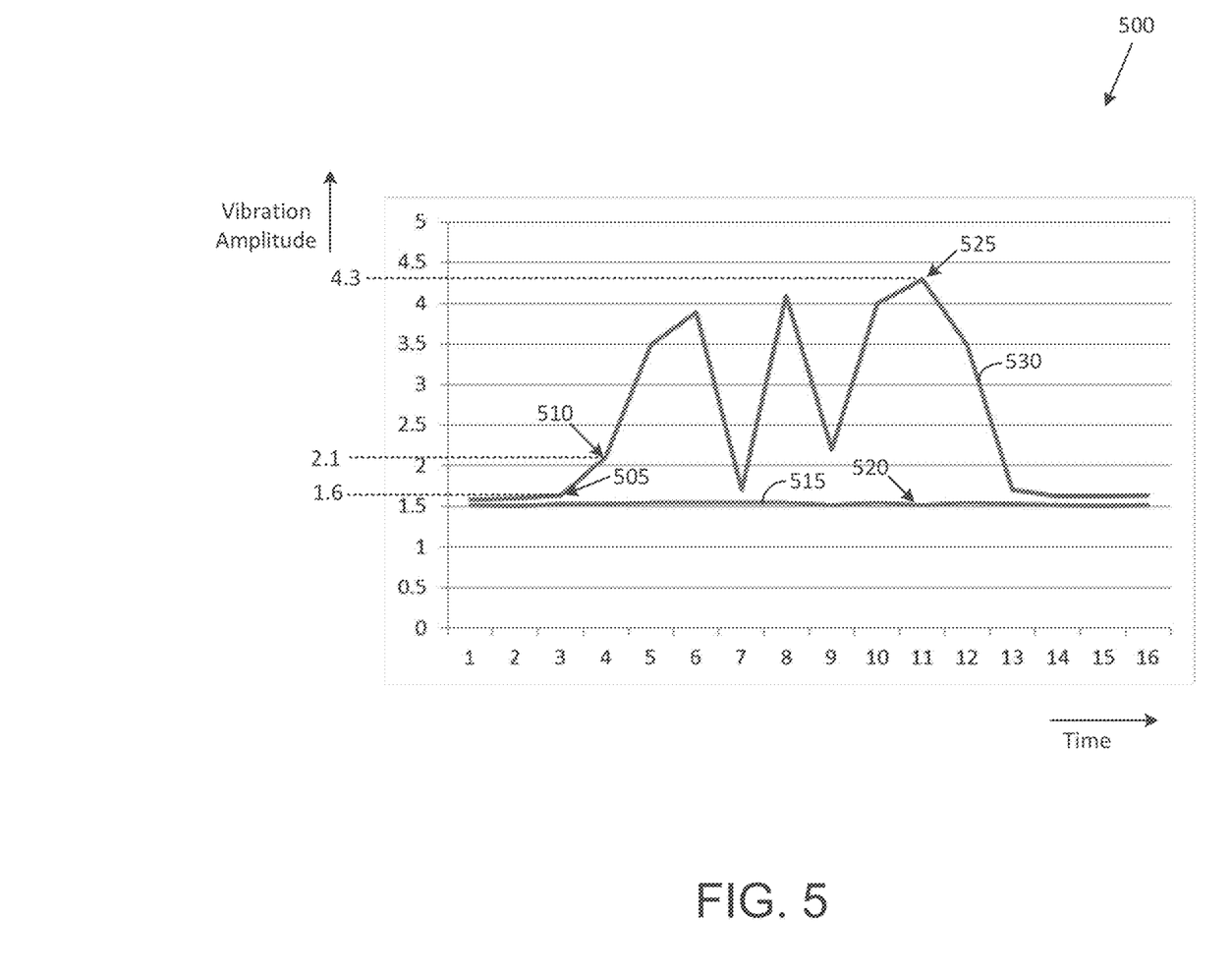
FIG. 5 shows a graph of vibration amplitude versus time in accordance with an exemplary embodiment of the disclosure.

FIG. 5 shows a graphical representation 500 of vibration amplitude versus time. The graph 515 indicates a time-variant characteristic of a synchronous vibration parameter of the turbomachine 105. The graph 530 indicates a time-variant characteristic of a broadband vibration parameter of the turbomachine 105. Attention is drawn to an exemplary sloping portion of the graph 530 that extends between a first instant in time 505 (having a vibration amplitude of about 1.6) and a second instant in time 510 (having a vibration amplitude of about 2.1). The relevance of this sloping portion of the graph 530 will now be explained by referring to the blocks 415 and 420 shown in FIG. 4 and described above to some extent. With reference to block 415 shown in FIG. 4, it can be understood that an abrupt change is occurring at the first instant in time 505. With reference to block 420 shown in FIG. 4, the extent of the abrupt change can be evaluated based on the sloping portion. For example, the abrupt change can be characterized by an extent of change in amplitude (Y-axis readings 2.1−1.6=0.5) and/or by an extent of change in rate (slope measurement of the sloping portion).

When the client computer 250 uses a first threshold value pertaining to a change in amplitude (0.75, for example), the operation indicated in block 420 will result in a determination being made that the change in amplitude (0.5) is acceptable and thus fails to indicate a fluid induced instability condition in the turbomachine 105. When the client computer 250 uses a first threshold value pertaining to a rate change (using a running speed of about 1000 rpm, for example), the operation indicated by block 420 will result in a determination being made that a change in running speed to about 1500 rpm has resulted in a slope of the sloping portion exceeding the first threshold value thus indicating a fluid induced instability condition in the turbomachine 105.

Now turning to block 425 shown in FIG. 4, it can be observed from the graph 515 that the synchronous vibration amplitude does not exceed a second threshold value (0.3 vibration amplitude change, for example).

With reference to block 430 shown in FIG. 4, attention is drawn to reference numerals 525 and 520 that can be used to determine an exemplary difference in amplitudes between a synchronous vibration parameter and a broadband vibration parameter associated with the turbomachine 105. The amplitude of the broadband vibration parameter at the point 525 is around 4.3 and the amplitude of the synchronous vibration parameter at the point 520 is around 1.5, thereby indicating a difference in amplitude of about 2.8.

When the client computer 250 uses a third threshold value pertaining to a difference in amplitude between the synchronous vibration parameter and the broadband vibration parameter (3.0, for example), the operation indicated by block 425 will result in a determination being made that the difference in amplitude (2.8) is acceptable and thus fails to indicate an anomalous or abnormal vibration in the turbomachine 105.

Figure 6:
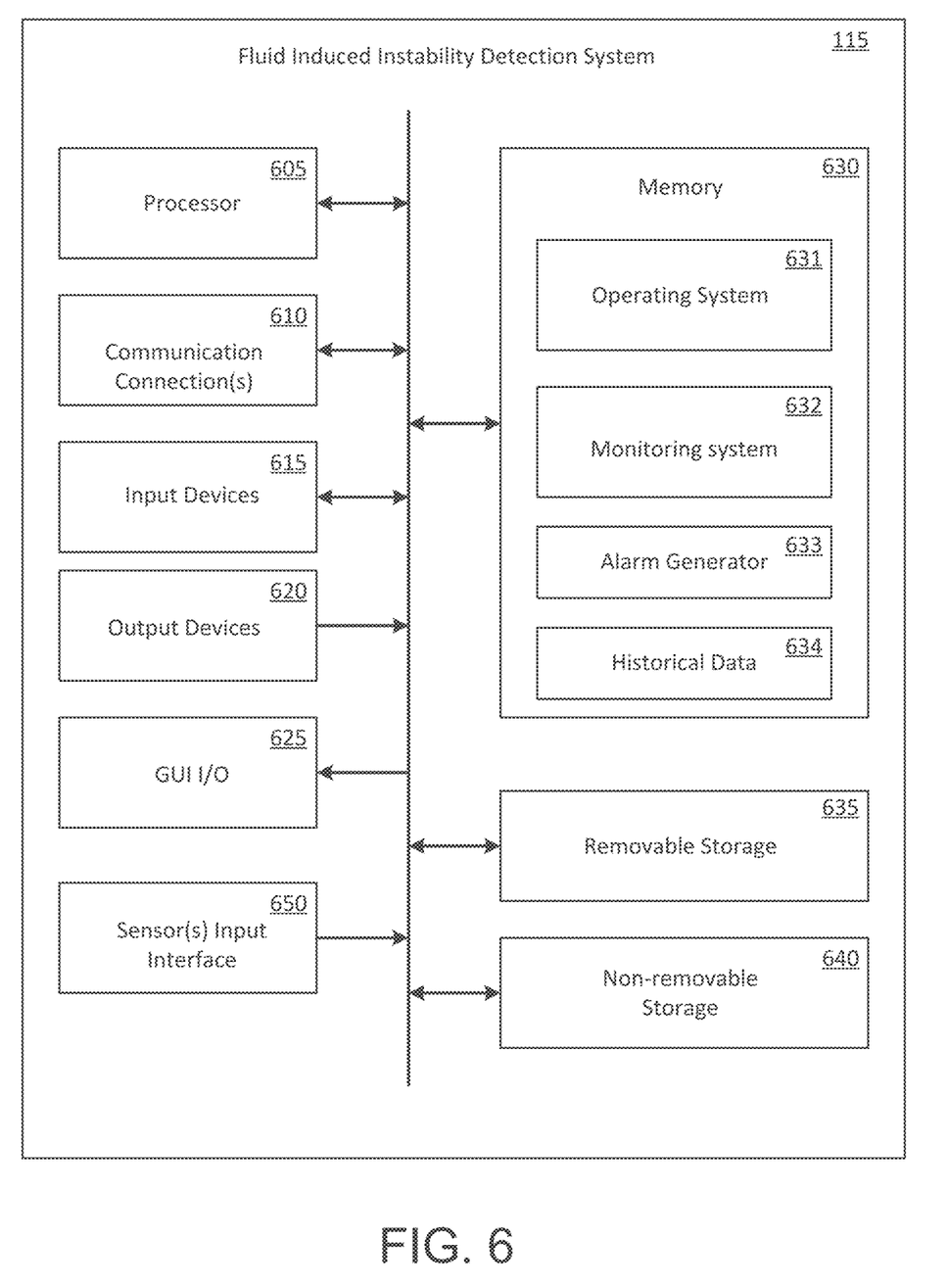
FIG. 6 illustrates some exemplary components that may be included in a fluid induced instability detection system in accordance with an exemplary embodiment of the disclosure.

FIG. 6 illustrates some exemplary components that may be included in the fluid induced instability detection system 115 in accordance with another exemplary embodiment of the disclosure. One or more processors, such as the processor 605, can be configured to interact with a memory 630. The processor 605 can be implemented and operated using appropriate hardware, software, firmware, or combinations thereof. Software or firmware implementations can include computer-executable or machine-executable instructions written in any suitable programming language to perform the various functions described. In one embodiment, instructions associated with a function block language can be stored in the memory 630 and executed by the processor 605.

The memory 630 can be used to store program instructions that are loadable and executable by the processor 605, as well as to store data generated during the execution of these programs. Depending on the configuration and type of the fluid induced instability detection system 115, the memory 630 can be volatile (such as random access memory (RAM)) and/or non-volatile (such as read-only memory (ROM), flash memory, etc.). In some embodiments, the memory devices can also include additional removable storage 635 and/or non-removable storage 640 including, but not limited to, magnetic storage, optical disks, and/or tape storage. The disk drives and their associated computer-readable media can provide non-volatile storage of computer-readable instructions, data structures, program modules, and other data. In some implementations, the memory 630 can include multiple different types of memory, such as static random access memory (SRAM), dynamic random access memory (DRAM), or ROM.

The memory 630, the removable storage, and the non-removable storage are all examples of non-transient computer-readable storage media. Such non-transient computer-readable storage media can be implemented in any method or technology for storage of information such as computer-readable instructions, data structures, program modules or other data. Additional types of non-transient computer-readable storage media that can be present include, but are not limited to, programmable random access memory (PRAM), SRAM, DRAM, ROM, electrically erasable programmable read-only memory (EEPROM), compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the processor 605. Combinations of any of the above should also be included within the scope of non-transient computer-readable media.

Turning to the contents of the memory 630, the memory 630 can include, but is not limited to, an operating system (OS) 631 and one or more application programs or services for implementing the features and aspects disclosed herein. Such applications or services can include a monitoring system 632, an alarm generator 633, and historical data 634. In one embodiment, each of these applications or services can be implemented by software that is provided in configurable control block language and is stored in non-volatile memory.

The exemplary embodiment of the fluid induced instability detection system 115 shown in FIG. 6 can include various other components such as communication connections 610 (such as links 102 and link 103), input devices 615, output devices 620, a GUI I/O 625 (which can be used to couple a graphical user interface to the fluid induced instability detection system 115) and a sensor interface 650 (such as the sensor interface 305 shown in FIG. 3).

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the exemplary embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A system comprising:
a turbomachine;
a sensor system coupled to the turbomachine, the sensor system configured to monitor at least two vibration parameters of the turbomachine when the turbomachine is in operation, the at least two vibration parameters comprising a synchronous vibration parameter and a broadband vibration parameter; and
a fluid induced instability detection system configured to receive the at least two vibration parameters from the sensor system, and to use the at least two vibration parameters to detect a change in at least one fluid flow characteristic, the change in the at least one fluid flow characteristic indicative of a fluid induced instability condition in the turbomachine.

2. The system of claim 1, wherein the turbomachine includes fluid film bearings and is at least one of a gas turbine, a steam turbine, a generator, an expander, a fan, a compressor, or a pump.

3. The system of claim 1, wherein the change in the at least one fluid flow characteristic is associated with a lubricating oil flow disturbance.

4. The system of claim 3, wherein the synchronous vibration parameter is associated with a running speed vibration component of the turbomachine, and the broadband vibration parameter is associated with a combination of the running speed vibration component of the turbomachine and at least one additional vibration component of the turbomachine.

5. The system of claim 4, wherein the sensor system includes at least one sensor which senses vibrations associated with the broadband vibration parameter.

6. The system of claim 4, wherein the sensor system is further configured to monitor a speed parameter and a load parameter of the turbomachine when the turbomachine is in operation, and wherein the fluid induced instability detection system is configured to detect the fluid induced instability condition in the turbomachine by detecting at least one of a change in amplitude or a rate change in one or more of the synchronous vibration parameter, the broadband vibration parameter, the speed parameter, or the load parameter.

7. The system of claim 6, wherein detecting the at least one of the change in amplitude or the rate change comprises applying a threshold value to at least one of the synchronous vibration parameter, the broadband vibration parameter, the speed parameter, or the load parameter.

8. The system of claim 7, further comprising:
a historical database containing historical performance data of the turbomachine, the historical database accessible by the fluid induced instability detection system when detecting the threshold value.

9. The system of claim 6, wherein detecting the at least one of the change in amplitude or the rate change by the fluid induced instability detection system comprises applying a mathematical formula to process at least one combination of two or more of the synchronous vibration parameter, the broadband vibration parameter, the speed parameter, or the load parameter.

10. A method comprising:
monitoring at least two vibration parameters of a turbomachine when the turbomachine is in operation, the at least two vibration parameters comprising a synchronous vibration parameter and a broadband vibration parameter; and using at least the at least two vibration parameters to detect a fluid induced instability condition in the turbomachine.

11. The method of claim 10, wherein the fluid induced instability condition comprises a lubricating oil flow disturbance.

12. The method of claim 11, wherein the synchronous vibration parameter is associated with a running speed vibration component of the turbomachine, and the broadband vibration parameter is associated with a combination of the running speed vibration component of the turbomachine and at least one additional vibration component of the turbomachine.

13. The method of claim 11, further comprising:
monitoring a speed parameter and a load parameter of the turbomachine when the turbomachine is in operation; and
detecting the fluid induced instability condition in the turbomachine by using at least one of a threshold value or a mathematical formula to detect at least one of an amplitude change or a rate change in one or more of the synchronous vibration parameter, the broadband vibration parameter, the speed parameter, or the load parameter.

14. The method of claim 13, further comprising:
using an alarm threshold to evaluate the fluid induced instability condition; and
generating an alarm based on evaluating the fluid induced instability condition.

15. A non-transitory computer-readable storage medium with instructions executable by at least one computer for performing operations comprising:
receiving from a sensor system, at least two vibration parameters of a turbomachine when the turbomachine is in operation, the at least two vibration parameters comprising a synchronous vibration parameter and a broadband vibration parameter; and
using at least the at least two vibration parameters to detect a fluid induced instability condition in the turbomachine.

16. The non-transitory computer-readable storage medium of claim 15 with additional instructions executable by the at least one computer for performing operations comprising:
receiving from the sensor system, a speed parameter and a load parameter of the turbomachine when the turbomachine is in operation; and
detecting the fluid induced instability condition in the turbomachine by using a threshold value to detect at least one of an amplitude change or a rate change in one or more of the speed parameter, the load parameter, or the at least the at least two vibration parameters.

17. The non-transitory computer-readable storage medium of claim 16 with additional instructions executable by the at least one computer for performing operations comprising:
using an alarm threshold to evaluate the amplitude change or the rate change; and
generating an alarm when at least one of the amplitude change or the rate change exceeds the alarm threshold.

18. The non-transitory computer-readable storage medium of claim 17 with additional instructions executable by the at least one computer for performing operations comprising:
using a historical database to detect the alarm threshold.

19. The non-transitory computer-readable storage medium of claim 15 with additional instructions executable by the at least one computer for performing operations comprising:
receiving from the sensor system, a speed parameter and a load parameter of the turbomachine when the turbomachine is in operation; and
detecting the fluid induced instability condition in the turbomachine by using a mathematical formula to detect at least one of an amplitude change or a rate change in one or more of a synchronous vibration parameter, a broadband vibration parameter, the speed parameter, or the load parameter.

20. The non-transitory computer-readable storage medium of claim 19, wherein using the mathematical formula comprises executing at least one of an addition operation, a subtraction operation, a multiplying operation, a division operation, or an integration operation.

* * * * *